July 20, 1971     H. MUELLER-TAMM ET AL     3,594,249
PRODUCTION OF NONPLANE BUILDING COMPONENTS COMPOSED OF
THERMOPLASTIC AND METAL LAYERS
Filed Sept. 11, 1968
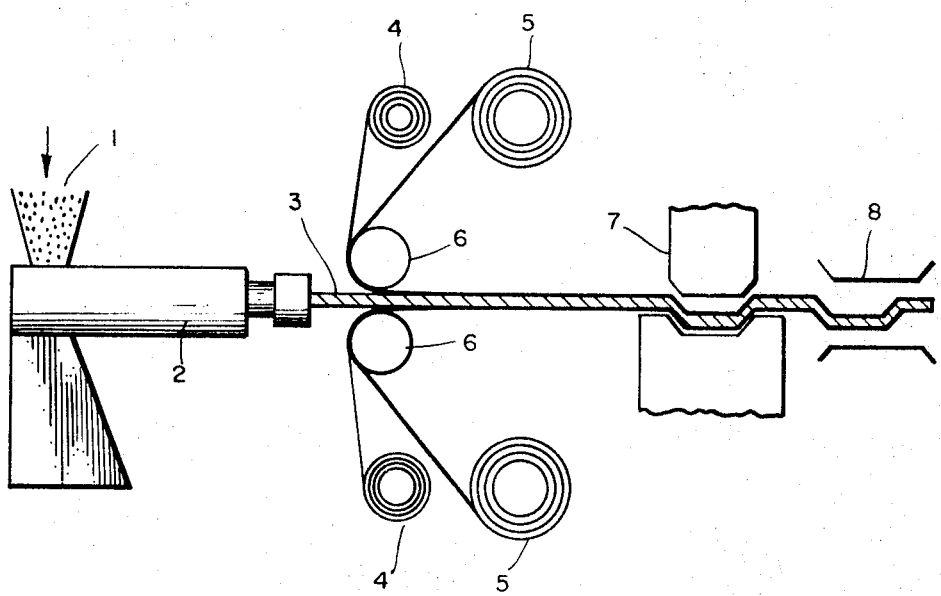
INVENTORS:
HEINZ MUELLER-TAMM
HANS FRIELINGSDORF
BY: Marzall, Johnston, Cook & Root
ATT'YS

United States Patent Office 3,594,249
Patented July 20, 1971

3,594,249
PRODUCTION OF NONPLANE BUILDING COMPONENTS COMPOSED OF THERMOPLASTIC AND METAL LAYERS
Heinz Mueller-Tamm, Ludwigshafen (Rhine), and Hans Frielingsdorf, Bad Durkheim, Germany, assignors to Badische Anilin- & Soda-Fabrik Aktiengesellschaft, Ludwigshafen (Rhine), Germany
Filed Sept. 11, 1968, Ser. No. 759,018
Claims priority, application Germany, Sept. 14, 1967, P 17 04 496.1
Int. Cl. B31f 1/00
U.S. Cl. 156—199
6 Claims

ABSTRACT OF THE DISCLOSURE

A process for the production of nonplane building components which comprise a relatively thick inner ply of the thermoplastic and relatively thin outer plies of metal. The building components are prepared by continuously preparing a board from a polyethylene by means of a screw extruder at elevated temperature, covering the board thus obtained on both sides first with a film of a special terpolymer and then with a metal sheet at elevated temperature, forming a sandwich assembly from the whole under the pressure of rollers and then bringing the plane board into the desired nonplane shape at elevated temperature using external forces.

---

The present invention relates to a process for the production of nonplane building components which comprise a relatively thick inner ply of a thermoplastic and relatively thin outer plies of metal.

In a known method for the production of building components of this type, plane boards having the said construction are shaped at room temperature with equipment conventionally used in processing sheet metal, the shaping into the desired shape usually being effected by bending, pressing or drawing.

These cold methods have the disadvantage that great forces have to be exerted in the shaping and the dimensional stability is small due to the resilience of the plastics. If it is desired to avoid this disadvantage or to achieve certain effects during the shaping, the plane boards mentioned above may also be heated to the temperature necessary for plasticization of the plastic material and then shaped. It is a disadvantage that a special heating operation is required. Another disadvantage is that this hot method can only be used in the case of boards whose inner ply of plastics and outer plies of metal are bonded by a contact adhesive, for prior art adhesives of this type have only slight creep rupture strengths and inadequate resistance to high temperatures, whereas the two-component adhesives often successfully used in the production of plane sandwich panels do not permit shaping to a desirable extent.

The present invention has for its object to provide a process of the type referred to above which is not attended by the said disadvantages or in which they occur to a considerably smaller extent.

We have found that the said object is achieved when a sheet of metal is continuously applied to a special type of polyethylene (as the inner relatively thick ply) by means of a special adhesion promoting layer under special process conditions and the resultant composite unit is brought into the desired shape in conventional equipment immediately after its production while making use of the molten to plastic condition of the thermoplastic inner ply.

In accordance with this invention therefore a process of the type referred to above comprises continuously making a board having a thickness of 1 to 20 mm. from a polyethylene having a density of from 0.918 to 0.930 g./cm.$^3$ and a melt index of 0.2 to 5 (according to ASTM D1238–65 T) at a temperature of the material 120° to 220° C. (preferably 160° to 180° C.) covering the resultant board by means of a pair of rollers at a temperature of the material of 100° to 220° C. (preferably 120° to 160° C. continuously on both sides with a film having a thickness of 0.01 to 0.2 mm. of a terpolymer containing 60 to 90 parts by weight of ethylene units, 0.5 to 20 parts by weight of units of an ethylenically unsaturated carboxylic acid and 0.5 to 20 parts by weight of units of an ester of an ethylenically unsaturate carboxylic acid, the sum of the parts by weight being 100 and then with a metal foil having a thickness of from 0.05 to 1.5 mm., forming a sandwich assembly under a roller pressure of 0.1 to 4 kg./cm.$^2$, bringing the resultant plane board into the desired nonplane shape while using external forces in conventional equipment at a temperature which is between the extrusion temperature and the softening point of the polyethylene, and cooling the product, or allowing it to cool, to ambient temperature.

In an advantageous embodiment of the process according to this invention use is made of a film of a terpolymer which contains 71 to 90 parts by weight of ethylene units, 3 to 9 parts by weight of units of an aliphatic ethylenically unsaturated carboxylic acid having three to five carbon atoms, 1 to 20 parts by weight of units of an alkyl ester (having one to eight carbon atoms in the alkyl radical) of an aliphatic ethylenically unsaturated carboxylic acid having three to five carbon atoms, the sum of the parts by weight amounting to 100.

In a particularly advantageous embodiment of the process according to the invention use is made of a film of a terpolymer which contains 71 to 90 parts by weight of ethylene units, 3 to 9 parts by weight of acrylic acid units and 1 to 20 parts by weight of tertiary-butyl acrylate units, the sum of the parts by weight being 100.

Polyethylene having a density of 0.918 to 0.930 g./cm.$^3$ and a melt index of from 0.2 to 5 is suitable for carrying out the process according to this invention.

The adhesive film to be used according to this invention consists of a known terpolymer which can be processed into film by conventional methods for ethylene polymers. It is advantageous for the terpolymer used to have the following physical data: density: 0.9 to 1.1 g./cm.$^3$; crystalline fraction: less than 60%; melting range: 70° to 120° C.; Shore hardness C: from 50 to 90.

The metal foil may be a conventional one; for example sheet aluminum, copper, brass and steel have proved to be suitable.

The production of the nonplane building components may be carried out by means of conventional equipment for the production of plastics boards. Such equipment consists in the present case of a screw extruder, a pair of rollers for uniting the plies, a shaping tool and a cooling zone. Bonding between polyethylene, adhesive film and sheet metal is effected by bringing these components into contact in the nip of two rollers, the polyethylene which is still hot causing temporary fusion of the adhesive film. Immediately after this, the plane board is processed on conventional equipment for shaping sheet metal, for example by bending, pressing or drawing. Profiles may thus be produced in the longitudinal or transverse direction. Moreover the sandwich panels may be provided along the side with a beaded edge which then serves as edge protection against weathering. The nonplane building component thus shaped is then cooled or allowed to cool.

The accompanying drawing shows diagrammatically a hopper 1 containing plastics granulate, a screw extruder 2, a polyethylene board, 3, a terpolymer film 4, sheet metal 5, a pair of rollers 6, shaping equipment 7 and a cooling zone 8.

EXAMPLE

A board having a thickness of 3 mm. is continuously extruded from polyethylene having a density of 0.918 g./cm.$^3$ and a melt index of 1.5 at a temperature of the material of 190° C. from a screw extruder having a 90 mm. screw and a sheeting die having a width of 600 mm. The board, while in the fused condition (temperature of the material about 160° C). is covered on each side with a film having a thickness of 0.1 mm. of a terpolymer (made from 88% by weight of ethylene, 2.7% by weight of acrylic acid and 9.3% by weight of tertiary-butyl acrylate) and simultaneously thereon, also on each side, with an aluminum foil having a thickness of 0.3 mm., the whole then being brought into intimate contact through a pair of rollers heated to 70° C. under a roller pressure of 1 kg./cm.$^2$. The sandwich panel is then corrugated at a temperature of the polyethylene of 140° C. in a continuous profile press in a transverse direction, the distance between corrugations being 80 mm. and the depth 20 mm. The corrugated boards thus prepared may then be cooled to ambient temperature. The production rate is 1.45 meters per minute, which is equivalent to an output of about 180 kg. of polyethylene per hour.

We claim:

1. A process for the production of nonplane building components comprising a relatively thick inner ply of a thermoplastic polymer and relatively thin outer plies of metal which comprises extruding a sheet having a thickness of from 1 to 20 mm. of a polyethylene having a density of 0.918 to 0.930 g./cm.$^3$ and a melt index of 0.2 to 5 (according to ASTM D1238-65 T) at a temperature of 120° to 220° C., applying to each face of the sheet at a temperature of the polyethylene of 100° to 220° C. (a) first a film having a thickness of 0.01 to 0.2 mm. of a terpolymer which contains 60 to 90 parts by weight of ethylene units, 0.5 to 20 parts by weight of units of an ethylenically unsaturated carboxylic acid and 0.5 to 20 parts by weight of units of an ester of an ethylenically unsaturated carboxylic acid, the sum of the parts by weight being 100, and (b) then a sheet metal having a thickness of from 0.05 to 1.5 mm., forming the sheets into a sandwich panel under a roller pressure of 0.1 to 4 kg./cm.$^2$ and shaping the sheet into a desired nonplane shape at a temperature which is between the extrusion temperature and the softening point of polyethylene.

2. A process as claimed in claim 1 wherein a film of a terpolymer is used which contains 71 to 90 parts by weight of ethylene units, 3 to 9 parts by weight of units of an aliphatic ethylenically unsaturated carboxylic acid having three to five carbon atoms and 1 to 20 parts by weight of units of an alkyl ester (having one to eight carbon atoms in the alkyl radical) of an aliphatic ethylenically unsaturated carboxylic acid having three to five carbon atoms, the sum of the parts by weight amounting to 100.

3. A process as claimed in claim 1 wherein use is made of a film of a terpolymer containing 71 to 90 parts by weight of ethylene units, 3 to 9 parts by weight of acrylic acid units and 1 to 20 parts by weight of tertiary-butyl acrylate units, the sum of the parts by weight amounting to 100.

4. A process as claimed in claim 1 wherein the extrusion temperature is from 160° to 180° C.

5. A process as claimed in claim 1 wherein the temperature of said film application is from 120° to 160° C.

6. A process as claimed in claim 1 wherein the terpolymer has the following physical data:
density: 0.9 to 1.1 g./cm.$^3$; crystalline fraction: less than 60%; melting range: 70° to 120° C.; Shore hardness C: from 50 to 90.

References Cited

UNITED STATES PATENTS

| | | | |
|---|---|---|---|
| 3,275,589 | 9/1966 | Alexander et al. | 156—332X |
| 3,320,115 | 5/1967 | Reid et al. | 156—334 |
| 3,442,752 | 5/1969 | Sandler et al. | 156—332X |
| 3,451,871 | 6/1969 | Baver et al. | 156—244 |

CARL D. QUARFORTH, Primary Examiner

S. J. LECHERT, JR., Assistant Examiner

U.S. Cl. X.R.

156—200, 206, 222, 244, 309